United States Patent
Smolinske

(10) Patent No.: US 9,674,722 B1
(45) Date of Patent: Jun. 6, 2017

(54) METHOD FOR TESTING A GSM (GLOBAL SYSTEM FOR MOBILE COMMUNICATIONS) HANDSET WITH REDUCED SIGNALING REQUIREMENTS

(71) Applicant: LitePoint Corporatin, Sunnyvale, CA (US)

(72) Inventor: Jeffrey Charles Smolinske, Elk Grove Village, IL (US)

(73) Assignee: LitePoint Corporation, Sunnyvale, CA (US)

( * ) Notice: Subject to any disclaimer, the term of this patent is extended or adjusted under 35 U.S.C. 154(b) by 0 days.

(21) Appl. No.: 15/254,260

(22) Filed: Sep. 1, 2016

(51) Int. Cl.
*H04W 24/08* (2009.01)
*H04W 68/00* (2009.01)
*H04W 12/06* (2009.01)

(52) U.S. Cl.
CPC .......... *H04W 24/08* (2013.01); *H04W 12/06* (2013.01); *H04W 68/005* (2013.01)

(58) Field of Classification Search
CPC .... H04W 24/08; H04W 12/06; H04W 68/005
See application file for complete search history.

(56) References Cited

U.S. PATENT DOCUMENTS

| 2003/0185216 A1* | 10/2003 | Wende | H04L 12/2697 370/395.5 |
| 2010/0007355 A1* | 1/2010 | Olgaard | H04B 17/327 324/601 |
| 2010/0100766 A1* | 4/2010 | Bengtsson | H04W 24/06 714/23 |

OTHER PUBLICATIONS

Generation Partnership Project; 3GPP TS 04.18 v8.27.0, 3rd Technical Specification Group GSM/EDGE Radio Access Network; Mobile radio interface layer 3 specification; Radio Resource Control Protocol (Release 1999), May 2006.
3rd Generation Partnership Project; 3GPP TS 24.008 V3.20.0, Technical Specification Group Core Network; Mobile radio interface layer 3 specification; Core Network Protocols; Stage 3 (Release 1999), Dec. 2005.

* cited by examiner

*Primary Examiner* — Tuan Pham
(74) *Attorney, Agent, or Firm* — Banner & Witcoff, Ltd.

(57) ABSTRACT

Method for establishing a mobile terminated call between a Global System for Mobile Communications (GSM) test system and a GSM mobile transceiver device under test (DUT) with reduced signaling via a call control (CC) sublayer of layer 3.

21 Claims, 7 Drawing Sheets

GSM Protocol Stack

Invention's GSM Mobile Terminated Call Release

_US 9,674,722 B1_

METHOD FOR TESTING A GSM (GLOBAL SYSTEM FOR MOBILE COMMUNICATIONS) HANDSET WITH REDUCED SIGNALING REQUIREMENTS

BACKGROUND

The present invention relates to testing of GSM (Global System for Mobile Communications) handsets, and in particular, to testing of such handsets with reduced requirements for signal interactions between the handset and testing resources.

Many of today's electronic devices use wireless signal technologies for both connectivity and communications purposes. Because wireless devices transmit and receive electromagnetic energy, and because two or more wireless devices have the potential of interfering with the operations of one another by virtue of their signal frequencies and power spectral densities, these devices and their wireless signal technologies must adhere to various wireless signal technology standard specifications.

When designing such wireless devices, engineers take extra care to ensure that such devices will meet or exceed each of their included wireless signal technology prescribed standard-based specifications. Furthermore, when these devices are later being manufactured in quantity, they are tested to ensure that manufacturing defects will not cause improper operation, including their adherence to the included wireless signal technology standard-based specifications.

For testing these devices following their manufacture and assembly, current wireless device test systems typically employ testing systems having various subsystems for providing test signals to each device under test (DUT) and analyzing signals received from each DUT. Some systems (often referred to as "testers") include at least a vector signal generator (VSG) for providing the source signals to be transmitted to the DUT, and a vector signal analyzer (VSA) for analyzing signals produced by the DUT. The production of test signals by the VSG and signal analysis performed by the VSA are generally programmable (e.g., through use of an internal programmable controller or an external programmable controller such as a personal computer) so as to allow each to be used for testing a variety of devices for adherence to a variety of wireless signal technology standards with differing frequency ranges, bandwidths and signal modulation characteristics.

As part of the manufacturing of wireless communication devices, one significant component of production cost is costs associated with these manufacturing tests. Typically, there is a direct correlation between the cost of test and the sophistication of the test equipment required to perform the test. Thus, innovations that can preserve test accuracy while minimizing equipment costs (e.g., increasing costs due to increasing sophistication of necessary test equipment, or testers) are important and can provide significant costs savings, particularly in view of the large numbers of such devices being manufactured and tested.

Another critical factor in test costs is that of test times, and more particularly per-device test times, which must be minimized without compromising test integrity. Overall test times are determined by actual DUT testing activities (e.g., testing DUT performance in accordance with underlying system and DUT standards), DUT handling activities (e.g., connecting, disconnecting, moving of DUTs), and test preparation activities (e.g., initializing and/or synchronizing DUTs with the test system). Once test times have been optimally reduced for a single device, a next advance in reducing test time and cost involves testing multiple DUTs in a pipeline (e.g., overlapping sequences of distributed testing) or in parallel (e.g., concurrent testing of multiple DUTs) testing. This can include assembling and connecting one or more testers with additional signal routing circuitry (e.g., signal dividers, combiners, switches, multiplexors, etc.) as needed for providing receive (RX) signals to the DUTs and for receiving and analyzing transmit (TX) signals produced by the DUTs.

During the testing of cellular devices, e.g., mobile devices generally referred to as handsets, that rely on GSM technology, there is need for a testing system to make what is called a "mobile terminated call", i.e., in which the tester calls the DUT and the DUT (as the point of termination) answers, or "terminates", the call. Under normal use circumstances, when a GSM mobile device is called, the user physically responds to the call by pressing a button or touching a screen icon. In a test situation, other techniques are necessary. For example, some form of a mechanical apparatus could be used to achieve the button or screen icon press normally performed by a user. Alternatively, third-party software could be added to the DUT to enable it to answer the call automatically. Further alternatively, the test system can communicate with the DUT over an electrical connection (e.g., a micro-USB connector), which would enable the tester to determine that the DUT is "ringing" (receiving a call) and then issue a command over the electrical connection to answer the call. However, depending upon the state of completion of assembly of the DUT, such an electrical connection may not be available. Lastly, it may be possible to hand over a call from another radio-access technology (RAT), such as WCDMA, so that the call is already active when GSM mode testing is performed.

Accordingly, it would be desirable to have a technique capable of enabling testing of cellular devices, such as GSM handsets, without requiring mechanical manipulation or intervention (e.g., physical pressing of an electronic or electromechanical switch actuator, or touching of a touchscreen) or simulated presses (e.g., via software), as well as avoiding a need for signaling involved in call setup and completion that is otherwise extraneous to the DUT characteristics sought to be tested (e.g., a call handover from another (RAT).

SUMMARY

In accordance with the presently claimed invention, a method for establishing a mobile terminated call between a Global System for Mobile Communications (GSM) test system and a GSM mobile transceiver device under test (DUT) with reduced signaling via a call control (CC) sublayer of layer 3.

In accordance with one embodiment of the presently claimed invention, a method for establishing a mobile terminated call between a Global System for Mobile Communications (GSM) test system and a GSM mobile transceiver device under test (DUT) with reduced signaling via a connection management (CM) sublayer of layer 3, including:

communicating, via a radio resources (RR) sublayer of the layer 3 of the GSM test system for and from the DUT, a plurality of mobile terminated call initiation messages; and communicating, via the RR sublayer of the GSM test system for and from the DUT, a plurality of mobile terminated call activation messages;

wherein the plurality of mobile terminated call initiation messages is followed by the plurality of mobile terminated call activation messages with no intervening setup message from a CC sublayer of the GSM test system.

In accordance with another embodiment of the presently claimed invention, a method for establishing a mobile terminated call between a Global System for Mobile Communications (GSM) test system and a GSM mobile transceiver device under test (DUT) with reduced signaling via a connection management (CM) sublayer of layer 3, including:

communicating, via a radio resources (RR) sublayer of the layer 3 of the DUT from and for the GSM test system, a plurality of mobile terminated call initiation messages; and communicating, via the RR sublayer of the DUT from and for the GSM test system, a plurality of mobile terminated call activation messages;

wherein the plurality of mobile terminated call initiation messages is followed by the plurality of mobile terminated call activation messages with no intervening setup message from a CC sublayer of the GSM test system.

In accordance with another embodiment of the presently claimed invention, a method for establishing a mobile terminated call between a Global System for Mobile Communications (GSM) test system and a GSM mobile transceiver device under test (DUT) with reduced signaling via a connection management (CM) sublayer of layer 3, including:

communicating, via respective radio resources (RR) sublayers of the layer 3 of each of the GSM test system and the DUT, a plurality of mobile terminated call initiation messages; and communicating, via the respective RR sublayers of the GSM test system and the DUT, a plurality of mobile terminated call activation messages;

wherein the plurality of mobile terminated call initiation messages is followed by the plurality of mobile terminated call activation messages with no intervening setup message from a CC sublayer of the GSM test system.

DETAILED DESCRIPTION

Figure 1:
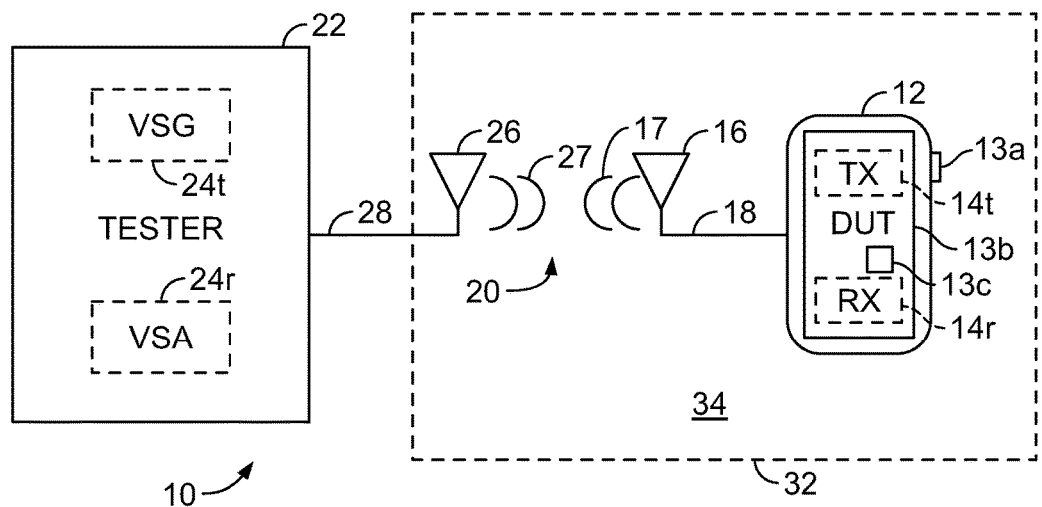
FIG. 1 depicts a conventional testing environment with a tester for testing a wireless DUT using radiated test signals.

The following detailed description is of example embodiments of the presently claimed invention with references to the accompanying drawings. Such description is intended to be illustrative and not limiting with respect to the scope of the present invention. Such embodiments are described in sufficient detail to enable one of ordinary skill in the art to practice the subject invention, and it will be understood that other embodiments may be practiced with some variations without departing from the spirit or scope of the subject invention.

Throughout the present disclosure, absent a clear indication to the contrary from the context, it will be understood that individual circuit elements as described may be singular or plural in number. For example, the terms "circuit" and "circuitry" may include either a single component or a plurality of components, which are either active and/or passive and are connected or otherwise coupled together (e.g., as one or more integrated circuit chips) to provide the described function. Additionally, the term "signal" may refer to one or more currents, one or more voltages, or a data signal. Within the drawings, like or related elements will have like or related alpha, numeric or alphanumeric designators. Further, while the present invention has been discussed in the context of implementations using discrete electronic circuitry (preferably in the form of one or more integrated circuit chips), the functions of any part of such circuitry may alternatively be implemented using one or more appropriately programmed processors, depending upon the signal frequencies or data rates to be processed. Moreover, to the extent that the figures illustrate diagrams of the functional blocks of various embodiments, the functional blocks are not necessarily indicative of the division between hardware circuitry.

Wireless devices, such as cellphones, smartphones, tablets, etc., make use of standards-based technologies, such as IEEE 802.11a/b/g/n/ac, 3GPP LTE, and Bluetooth. The standards that underlie these technologies are designed to provide reliable wireless connectivity and/or communications. The standards prescribe physical and higher-level specifications generally designed to be energy-efficient and to minimize interference among devices using the same or other technologies that are adjacent to or share the wireless spectrum.

Tests prescribed by these standards are meant to ensure that such devices are designed to conform to the standard-prescribed specifications, and that manufactured devices continue to conform to those prescribed specifications. Most devices are transceivers, containing at least one or more receivers and transmitters. Thus, the tests are intended to confirm whether the receivers and transmitters both conform. Tests of the receiver or receivers (RX tests) of a DUT typically involve a test system (tester) sending test packets to the receiver(s) and some way of determining how the DUT receiver(s) respond to those test packets. Transmitters of a DUT are tested by having them send packets to the test system, which then evaluates the physical characteristics of the signals sent by the DUT.

Cellular devices operating in accordance with the 3GPP GSM cellular technology enable initiating (or originating) calls and responding (or terminating) to calls from other devices. In testing the physical layer (PHY) characteristics of such devices the test system may make what is called a "mobile terminated call", meaning that the mobile device is receiving a call rather than initiating a call. In normal use, the user of the mobile device answers such call by interacting with the graphical user interface (GUI), thereby causing the device to access its Call Control Layer (CCL) software. The GUI typically includes a button or icon for the user to press or touch, and indicates to the user that a call is active.

The CCL software exchanges several messages about the number being called, turns on the call notification feature at the device (e.g., an audible ringing, or a vibration), indicates when the call has been answered, and enables audio on the Full Rate Speech Traffic Channel (TCH/FS) for the user to speak with the caller. The call setup procedure, followed by a conversation phase, and, in turn, followed by a call release, is prescribed in the pertinent 3GPP standard under GSM Mobile Terminating Call Flow. This procedure is determined by the CCL software. Preceding execution of the CCL software, the standard prescribes an interrogation procedure, followed by an optional "enable ciphering" procedure, and, in turn, followed by call setup+conversation phase+call release. After the three call control procedures are completed, the flow ends with Radio Resource (RR) Connection Release.

As discussed in more detail below, in accordance with exemplary embodiments of the presently claimed invention, methods are provided for enabling termination of calls by the DUT without engaging the CCL software (e.g., including call setup, a conversation phase and call release), while other functions of the call are followed. For example, in accordance with exemplary embodiments, call termination flow includes: establishing a connection on the signaling channel; querying the identity of the DUT; optional authentication of the DUT; optionally enabling ciphering; and establishing TCH/FS. Not included are call setup, a conversation phase or call release. This enables the tester to: make measurements using the TCH/FS; perform handovers to other bands and channels; perform bit-error-rate (BER) tests; and clear and re-establish "calls" as needed by testing requirements.

Hence, the presently claimed invention enables a normal TCH/FS to be established with sufficiently similar, if not identical, RF properties of a TCH/FS used during a normal Mobile Terminated call involving a user.

Referring to FIG. 1, a testing environment 10 for testing a GSM DUT in accordance with the presently claimed invention includes a tester 22 for providing and receiving wireless test signals for testing the DUT 12. The DUT 12 is preferably isolated within the interior 34 of an electromagnetically shielded enclosure 32. The DUT 12 includes transmitter circuitry 14t and receiver circuitry 14r for transmitting and receiving, respectively, radio frequency (RF) packet data signals. These transmit and receive signals are radiated from and received via one or more antennas 16 connected to the transmitter 14t and receiver 14r circuitry via one or more wired connections 18. Such wired RF signal connections 18 are typically in the form of controlled impedance conductive RF signal paths (e.g., coaxial, microstrip or stripline). The DUT also includes a physical switch 13a (e.g., electronic or electromechanical) and a display screen 13b on which a graphical user interface (GUI) appears, including a screen icon 13c (discussed in more detail below).

The tester 22 includes a test signal source 24t (e.g., a VSG) and a signal analysis subsystem 24r (e.g., a VSA) which provide RF transmit signals and receive RF signals, respectively. These RF signals are radiated by or received via one or more antennas 26 connected by one or more wired connections 28 to the signal source 24t and signal analysis subsystem 24r. Such wired RF signal connections 28 are typically in the form of controlled impedance conductive RF signal paths (e.g., coaxial, microstrip or stripline).

The transmit and receive signals communicated between the DUT 12 and tester 22 are conveyed as radiated RF signals 17, 27 over a wireless signal path 20 within the interior 34 of the shielded enclosure 32. Accordingly, the antennas 26 for the tester 22 are also contained within the interior 34 of the enclosure 32.

Examples of electromagnetically shielded testing enclosures and techniques for testing devices within such enclosures can be found the following patents and patent applications, the contents of each of which is incorporated herein by reference: U.S. Pat. Nos. 8,811,461 and 8,917,761, and U.S. patent application Ser. Nos. 13/839,162, 13/839,583 and 13/912,423.

As noted above, during normal operation by a user of a wireless handset, such as the DUT 12, during initiation of an incoming call, the user must physically interact with the device 12 to answer, or terminate, the call. Such interaction is in the form of pressing, or otherwise activating, the switch 13a or screen icon 13c to enable reception of the incoming call and enable the appropriate circuitry (e.g., audio processing circuitry) within the device 12 to complete the call. However, as also noted, in a testing environment 10, the device 12 is contained within the enclosure 32, which, due to the requirement of electromagnetic shielding, is sealed such that interaction with the device 12 to enable reception of a call is impossible absent the use of additional hardware or software within the enclosure 32 or within the DUT 12 itself. Accordingly, as discussed in more detail below, testing performed in accordance with the presently claimed invention eliminates the need for activation of the switch 13a or screen icon 13c.

Figure 2:
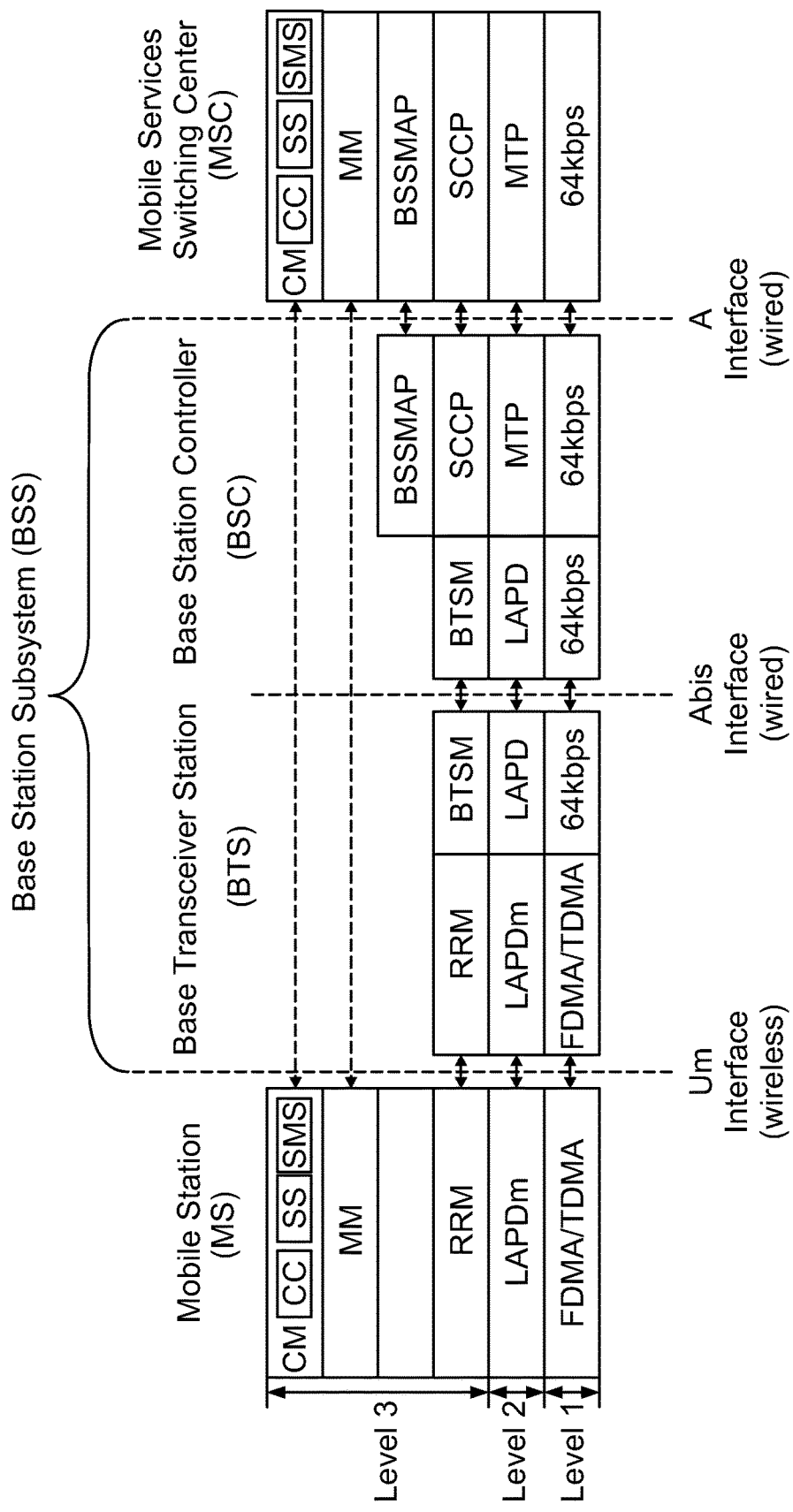
FIG. 2 depicts the 3GPP GSM Protocol Stack.

Referring to FIG. 2, a typical GSM protocol stack can be depicted as shown. The mobile services switching center (MSC) communicates with the mobile station (MS), or handset, via a base station subsystem (BSS), which includes a base station controller (BSC) and a base transceiver station (BTS). In accordance with well-known principles, the BSC communicates with the MSC via the A interface to provide a number of protocol transformations for communicating, via the Abis interface with the BTS, which, in turn, provides further protocol transformations for communicating with the MS via the Um interface. Messages conforming to the connection management (CM) and mobility management (MM) protocols are communicated directly between the MSC and MS via the A, Abis and Um interfaces.

Within the MS, the GSM signaling protocol includes three layers. Layer 1 is referred to as the physical layer, and uses the channel structures over the wireless Um interface. Layer 2 is a data link layer. At the Um interface, this layer is a modified version of the link access protocol for the D channel (LAPDm). Layer 3 is of primary interest for purposes of the presently claimed invention, and has three sub-layers: radio resource management (RRM or RR), mobility management (MM) and connection management (CM).

The RRM layer manages a link between the MS and the MSC, via the BSS. The MM layer, above the RRM layer, handles operations arising from subscriber mobility, plus authentication (optional) and security. At the top is the CM layer, which includes three sub-layers responsible for call control (CC), supplementary service (SS) management and short message service (SMS) management. Additional functions of the CM layer include call establishment, selection of service type and call release.

Figure 3:
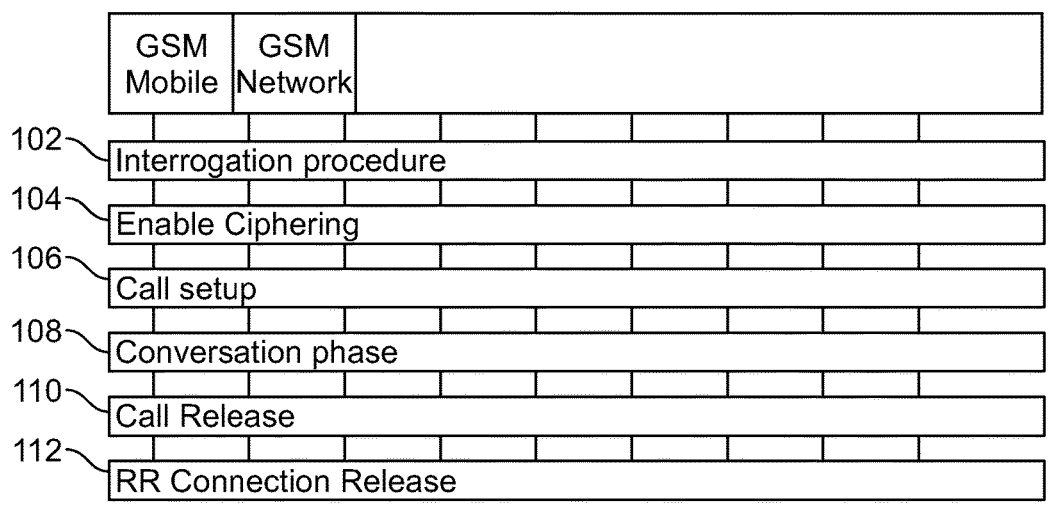
FIG. 3 depicts the 3GPP GSM standard flow for a Mobile Terminating Call.

Referring to FIG. 3, there are six major steps, or procedures, involved in initiating and terminating a GSM call: interrogation 102, enable cyphering 104, call setup 106, conversation phase 108, call release 110 and RRM connection release 112. Of these six procedures, three are under control of the CCL sub-layer of the CM layer: call setup 106, conversation phase 108 and call release 110.

Figure 4:
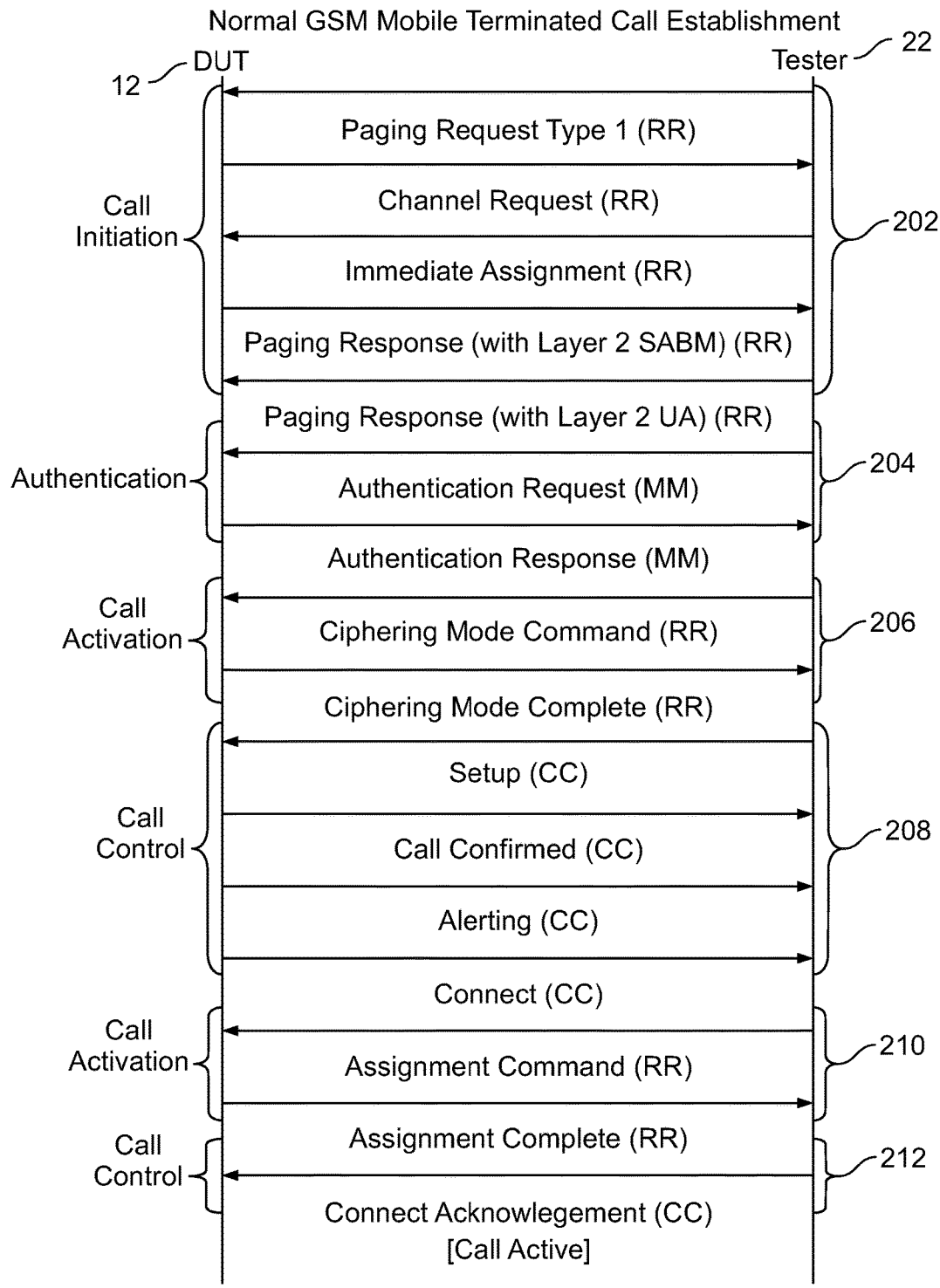
FIG. 4 depicts call-related messages as part of normal GSM mobile terminated call establishment.

Referring to FIG. 4, establishment of a normal GSM mobile terminated call (i.e., involving physical interaction by the user) includes four sets of messages: call initiation, authentication (optional), call activation and call control. Of these, subsets of the call activation and call control messages are interleaved, as shown, i.e., the call activation messages occur with an intervening subset of call control messages, with such subset including a setup message which initiates setup of a call.

The call initiation messages 202 include five messages exchanged between the DUT 12 and tester 22, with the arrow tail coinciding with the source and the arrow head coinciding with the destination. (For example, the Paging Request Type 1 message originates from the tester 22 and is received by the DUT 12, while the channel Request message originates from the DUT 12 and is received by the tester 22.) These messages 202 all conform to the RRM protocol.

The authentication messages 204 include Authentication Request and Authentication Response, in conformance with the MM protocol.

The call activation messages 206, 210 include four messages in conformance with the RRM protocol.

The call control messages 208, 212 include five messages, in conformance with the call control (CC) sub-layer protocol.

Figure 5:
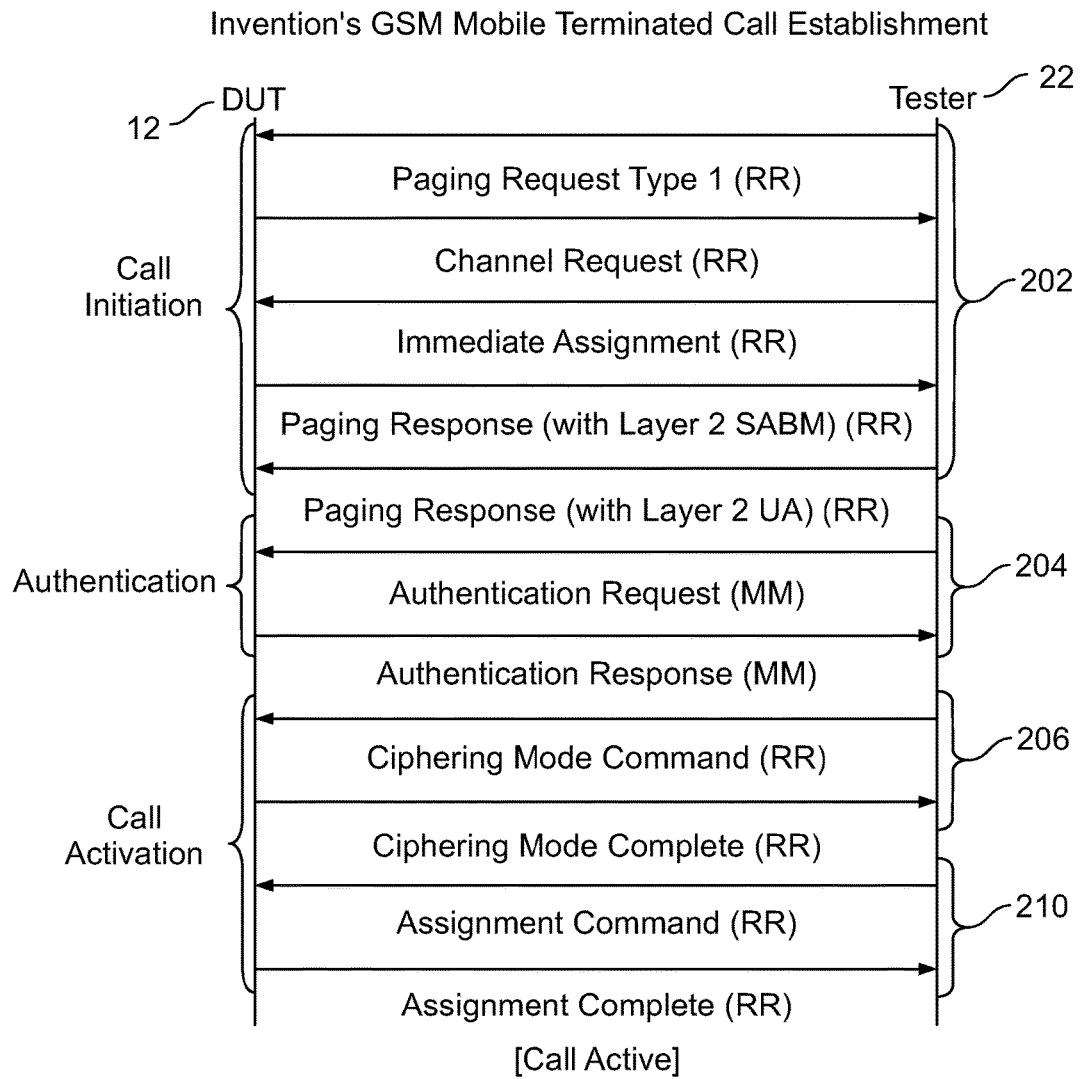
FIG. 5 depicts call-related messages as part of GSM mobile terminated call establishment in accordance with exemplary embodiments of the presently claimed invention.

Referring to FIG. 5, in accordance with exemplary embodiments of the presently claimed invention, establishment of the GSM mobile terminated call, which does not require user interaction via a physical switch or GUI, includes the same call initiation 202, authentication 204 and call activation 206, 210 messages. In other words, exchanges of the five call control messages 208, 212 are not performed. However, as will be understood by one of ordinary skill in the art, a requirement for user interaction with the DUT 12 in accordance with exemplary embodiments of the presently claimed invention can be avoided so long as at least a subset of the five call control messages 208, 212 are not performed. For example, so long as the Setup message is not received by the DUT 12 (e.g., by not transmitting the Setup message from the tester 22 or otherwise preventing it from being received by the DUT 12), then a Full Rate Speech Traffic Channel (TCH/FS) can still be established.

Figure 6:
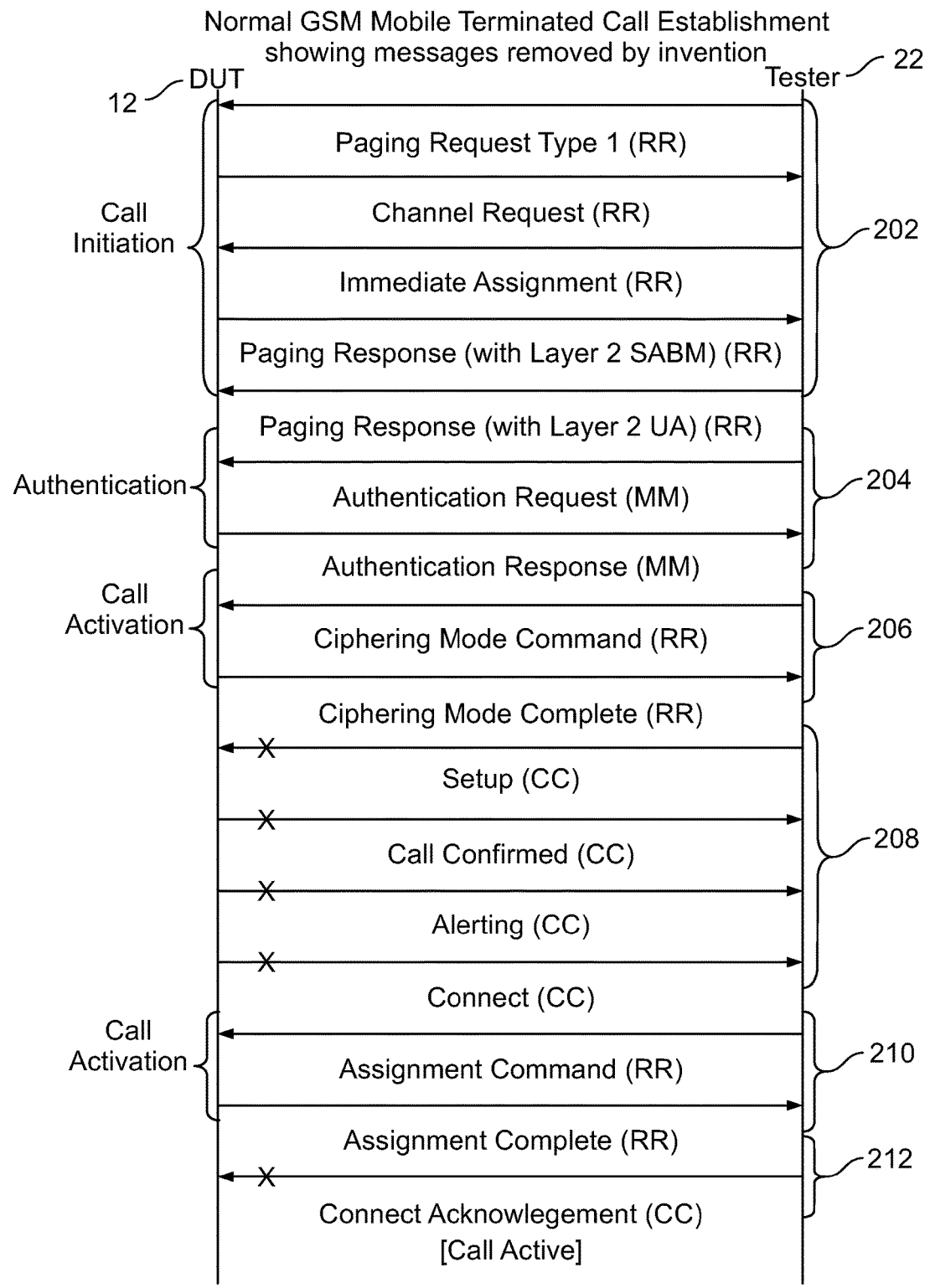
FIG. 6 identifies call-related messages eliminated from normal GSM mobile terminated call establishment in accordance with exemplary embodiments of the presently claimed invention.

Referring to FIG. 6, this elimination of the five call control messages is depicted in context, with the eliminated messages identified with an "X".

Figure 7:
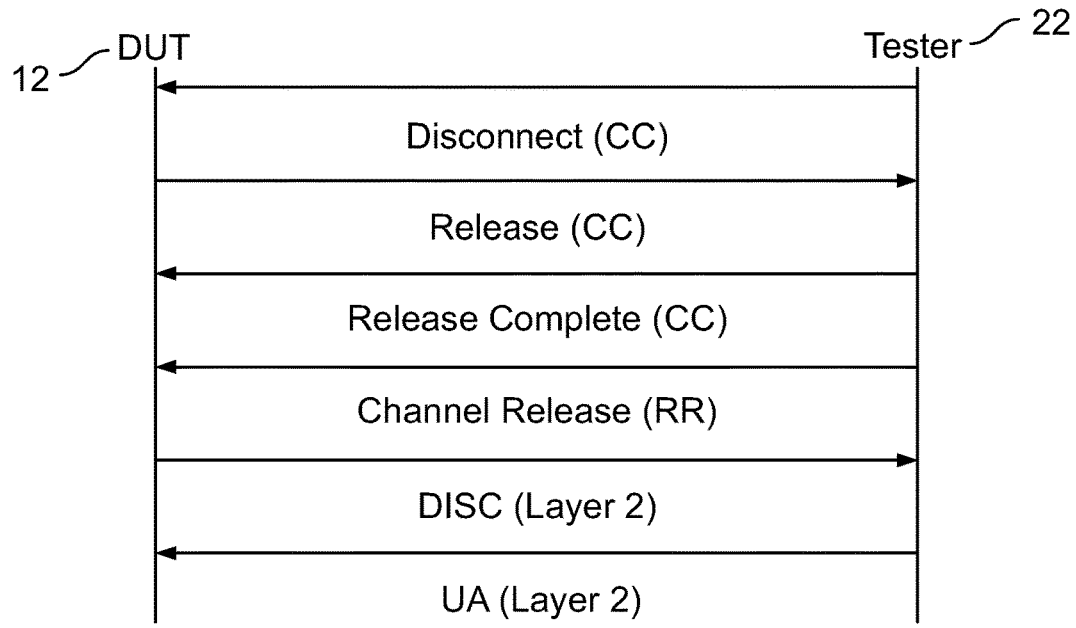
FIG. 7 depicts call-related messages as part of normal GSM mobile terminated call release.

Referring to FIG. 7, a release of a normal GSM mobile terminated call (i.e., a call in which user interaction is required) includes three messages in conformance with the CC sub-layer, a Channel Release message in conformance with the RRM layer, and two messages in conformance with the data link protocol of layer 2.

Figure 8:
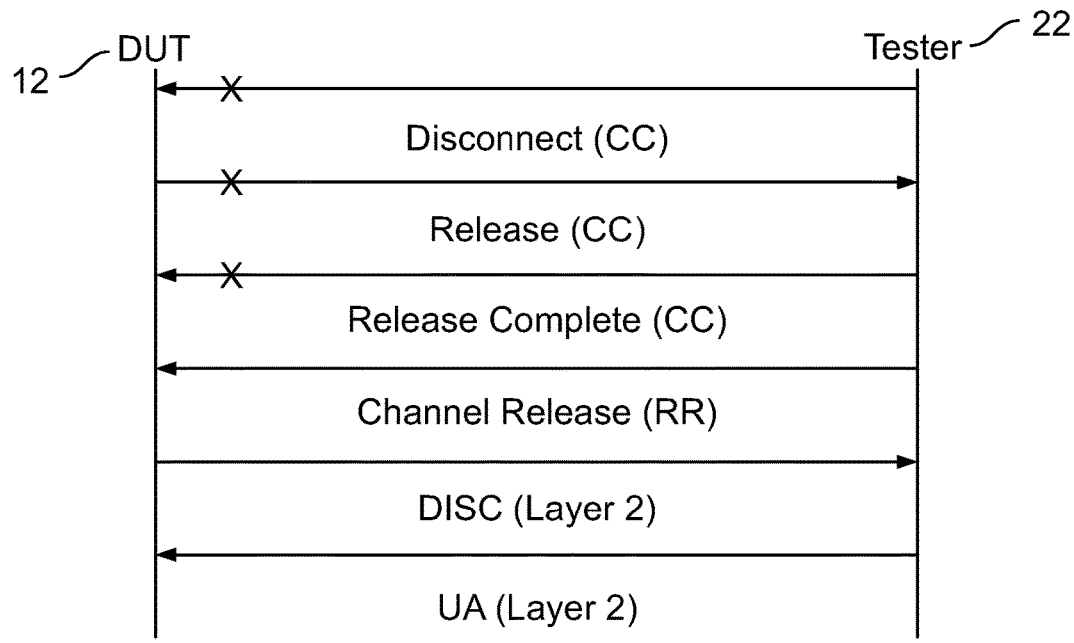
FIG. 8 identifies call-related messages eliminated from normal GSM mobile terminated call release in accordance with exemplary embodiments of the presently claimed invention.

Referring to FIG. 8, in accordance with exemplary embodiments of the presently claimed invention, release of a GSM mobile terminated call is achieved without requiring the three messages in conformance with the CC sub-layer.

Figure 9:
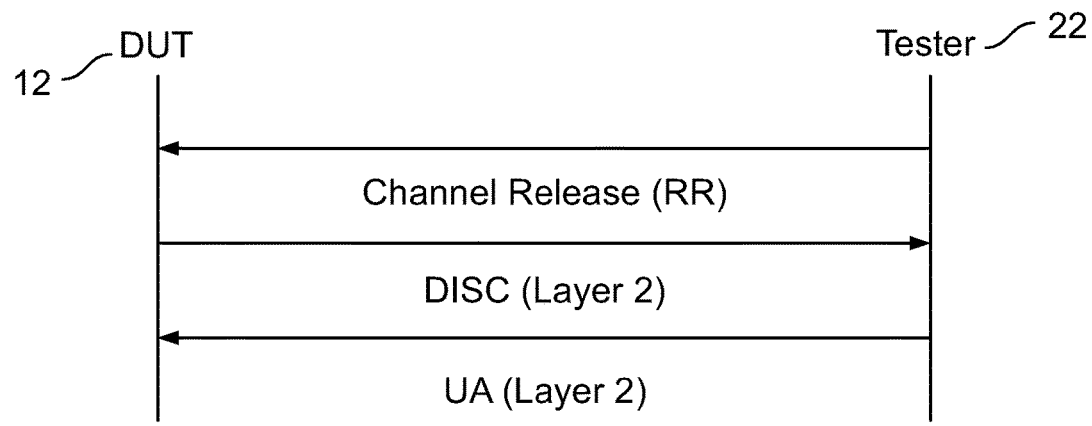
FIG. 9 depicts call-related messages as part of GSM mobile terminated call release in accordance with exemplary embodiments of the presently claimed invention.

Referring to FIG. 9, this results in the need for only three messages, instead of six.

Hence, the call initiation messages from the RR sublayer are followed by call authentication messages from the MM sublayer, which, in turn, are followed by call activation messages from the RR sublayer, with no intervention by at least some, if not all, call control messages from the CC sublayer. In other words, the sequence of call initiation messages followed by call authentication messages followed by call activation messages preferably includes no intervening call control messages. However, in accordance with embodiments of the presently claimed invention, even if this sequence does include a subset (i.e., one or more but fewer than all) of intervening call control messages, any such intervening call control messages, at a minimum, exclude (i.e., do not include) a setup message from the CC sublayer of the tester 22.

Various other modifications and alterations in the structure and method of operation of this invention will be apparent to those skilled in the art without departing from the scope and the spirit of the invention. Although the invention has been described in connection with specific preferred embodiments, it should be understood that the invention as claimed should not be unduly limited to such specific embodiments. It is intended that the following claims define the scope of the present invention and that structures and methods within the scope of these claims and their equivalents be covered thereby.

What is claimed is:

1. A method for establishing a mobile terminated call between a Global System for Mobile Communications (GSM) test system and a GSM mobile transceiver device under test (DUT) with reduced signaling via a call control (CC) sublayer of layer 3, comprising:
   communicating, via a radio resources (RR) sublayer of said layer 3 of said GSM test system for and from said DUT, a plurality of mobile terminated call initiation messages; and
   communicating, via said RR sublayer of said GSM test system for and from said DUT, a plurality of mobile terminated call activation messages;
   wherein said plurality of mobile terminated call initiation messages is followed by said plurality of mobile terminated call activation messages with no intervening setup message from a CC sublayer of said GSM test system.

2. The method of claim 1, wherein said communicating, via a RR sublayer of said layer 3 of said GSM test system for and from said DUT, a plurality of mobile terminated call initiation messages comprises:
   transmitting, with said GSM test system, a paging request message;
   receiving, with said GSM test system, a channel request message;
   transmitting, with said GSM test system, an immediate assignment message; and
   receiving, with said GSM test system, a paging response message.

3. The method of claim 1, further comprising communicating, via a mobility management (MM) sublayer of said layer 3 of said GSM test system for and from said DUT, a plurality of mobile terminated call authentication messages, wherein said plurality of mobile terminated call initiation messages is followed by said plurality of mobile terminated call authentication messages, which is followed by said plurality of mobile terminated call activation messages with no intervening setup message from a CC sublayer of said GSM test system.

4. The method of claim 3, wherein said communicating, via a MM sublayer of said layer 3 of said GSM test system for and from said DUT, a plurality of mobile terminated call authentication messages comprises:
   transmitting, with said GSM test system, an authentication request message; and
   receiving, with said GSM test system, an authentication response message.

5. The method of claim 3, wherein said communicating, via said RR sublayer of said GSM test system for and from said DUT, a plurality of mobile terminated call activation messages comprises:
  transmitting, with said GSM test system, a ciphering mode command message; and
  receiving, with said GSM test system, a ciphering mode complete message.

6. The method of claim 5, further comprising transmitting, with said GSM test system, an assignment command message following said receiving, with said GSM test system, a ciphering mode complete message with no intervening setup message from said CC sublayer of said GSM test system.

7. The method of claim 1, wherein said communicating, via said RR sublayer of said GSM test system for and from said DUT, a plurality of mobile terminated call activation messages comprises:
  transmitting, with said GSM test system, an assignment command message; and
  receiving, with said GSM test system, an assignment complete message.

8. A method for establishing a mobile terminated call between a Global System for Mobile Communications (GSM) test system and a GSM mobile transceiver device under test (DUT) with reduced signaling via a call control (CC) sublayer of layer 3, comprising:
  communicating, via a radio resources (RR) sublayer of said layer 3 of said DUT from and for said GSM test system, a plurality of mobile terminated call initiation messages; and
  communicating, via said RR sublayer of said DUT from and for said GSM test system, a plurality of mobile terminated call activation messages;
  wherein said plurality of mobile terminated call initiation messages is followed by said plurality of mobile terminated call activation messages with no intervening setup message from a CC sublayer of said GSM test system.

9. The method of claim 8, wherein said communicating, via a RR sublayer of said layer 3 of said DUT from and for said GSM test system, a plurality of mobile terminated call initiation messages comprises:
  receiving, with said DUT, a paging request message;
  transmitting, with said DUT, a channel request message;
  receiving, with said DUT, an immediate assignment message; and
  transmitting, with said DUT, a paging response message.

10. The method of claim 8, further comprising communicating, via a mobility management (MM) sublayer of said layer 3 of said DUT from and for said GSM test system, a plurality of mobile terminated call authentication messages, wherein said plurality of mobile terminated call initiation messages is followed by said plurality of mobile terminated call authentication messages, which is followed by said plurality of mobile terminated call activation messages with no intervening setup message from a CC sublayer of said GSM test system.

11. The method of claim 10, wherein said communicating, via a MM sublayer of said layer 3 of said DUT from and for said GSM test system, a plurality of mobile terminated call authentication messages comprises:
  receiving, with said DUT, an authentication request message; and
  transmitting, with said DUT, an authentication response message.

12. The method of claim 10, wherein said communicating, via said RR sublayer of said DUT from and for said GSM test system, a plurality of mobile terminated call activation messages comprises:
  receiving, with said DUT, a ciphering mode command message; and
  transmitting, with said DUT, a ciphering mode complete message.

13. The method of claim 12, further comprising receiving, with said DUT, an assignment command message following said transmitting, with said DUT, a ciphering mode complete message with no intervening setup message from said CC sublayer of said DUT.

14. The method of claim 8, wherein said communicating, via said RR sublayer of said DUT from and for said GSM test system, a plurality of mobile terminated call activation messages comprises:
  receiving, with said DUT, an assignment command message; and
  transmitting, with said DUT, an assignment complete message.

15. A method for establishing a mobile terminated call between a Global System for Mobile Communications (GSM) test system and a GSM mobile transceiver device under test (DUT) with reduced signaling via a call control (CC) sublayer of layer 3, comprising:
  communicating, via respective radio resources (RR) sublayers of said layer 3 of each of said GSM test system and said DUT, a plurality of mobile terminated call initiation messages; and
  communicating, via said respective RR sublayers of said GSM test system and said DUT, a plurality of mobile terminated call activation messages;
  wherein said plurality of mobile terminated call initiation messages is followed by said plurality of mobile terminated call activation messages with no intervening setup message from a CC sublayer of said GSM test system.

16. The method of claim 15, wherein said communicating, via respective radio resources (RR) sublayers of said layer 3 of each of said GSM test system and said DUT, a plurality of mobile terminated call initiation messages comprises:
  conveying a paging request message from said GSM test system to said DUT;
  conveying a channel request message from said DUT to said GSM test system;
  conveying an immediate assignment message from said GSM test system to said DUT; and
  conveying a paging response message from said DUT to said GSM test system.

17. The method of claim 15, further comprising communicating, via respective mobility management (MM) sublayers of said layer 3 of said GSM test system and said DUT, a plurality of mobile terminated call authentication messages, wherein said plurality of mobile terminated call initiation messages is followed by said plurality of mobile terminated call authentication messages, which is followed by said plurality of mobile terminated call activation messages with no intervening setup message from a CC sublayer of said GSM test system.

18. The method of claim 17, wherein said communicating, via respective mobility management (MM) sublayers of said layer 3 of each of said GSM test system and said DUT, a plurality of mobile terminated call authentication messages comprises:
  conveying an authentication request message from said GSM test system to said DUT; and conveying an authentication response message from said DUT to said GSM test system.

19. The method of claim 17, wherein said communicating, via said respective RR sublayers of said GSM test system and said DUT, a plurality of mobile terminated call activation messages comprises:
   conveying a ciphering mode command message from said GSM test system to said DUT; and
   conveying a ciphering mode complete message from said DUT to said GSM test system.

20. The method of claim 19, further comprising conveying an assignment command message from said GSM test system to said DUT following said conveying a ciphering mode complete message from said DUT to said GSM test system with no intervening setup message from said respective CC sublayers of said GSM test system and said DUT.

21. The method of claim 15, wherein said communicating, via said respective RR sublayers of said GSM test system and said DUT, a plurality of mobile terminated call activation messages comprises:
   conveying an assignment command message from said GSM test system to said DUT; and
   conveying an assignment complete message from said DUT to said GSM test system.

* * * * *